(12) United States Patent
Toothman

(10) Patent No.: US 10,246,869 B1
(45) Date of Patent: Apr. 2, 2019

(54) CONSTRUCTION ASSEMBLY AND METHOD FOR MAKING AND USING THE SAME

(71) Applicant: Elevate Structure Inc., Atherton, CA (US)

(72) Inventor: Nathan Toothman, Atherton, CA (US)

(73) Assignee: ELEVATE STRUCTURE INC., Atherton, CA (US)

(*) Notice: Subject to any disclaimer, the term of this patent is extended or adjusted under 35 U.S.C. 154(b) by 0 days.

(21) Appl. No.: 15/908,570

(22) Filed: Feb. 28, 2018

(51) Int. Cl.
 *E04B 1/34* (2006.01)
 *E04B 1/24* (2006.01)
 (Continued)

(52) U.S. Cl.
 CPC .......... *E04B 1/3408* (2013.01); *E02D 27/016* (2013.01); *E02D 27/02* (2013.01);
 (Continued)

(58) Field of Classification Search
 CPC .................. E02D 27/016; E02D 27/02; E02D 2200/1664; E04B 1/24; E04B 1/28; E04B 1/3408; E04B 1/34305; E04B 1/344; E04B 2001/0053; E04B 2001/2466; E04B 2103/06; E04C 3/00; E04F 11/02; E04H 15/48
 (Continued)

(56) References Cited

U.S. PATENT DOCUMENTS 1,874,157 A * 8/1932 Bauer ..................... E04B 1/185
52/260
2,001,215 A * 5/1935 Ruppel ..................... E04B 1/24
403/157
(Continued)

FOREIGN PATENT DOCUMENTS

DE 202011000119 U1 * 6/2011 ........... E04B 2/7459
FR 2930568 A1 * 10/2009 ........... E04B 1/3404

OTHER PUBLICATIONS

DIY Plywood and 2×4 Box-Joint Bench—Without Cutting Joinery, Oct. 31, 2017 https://www.youtube.com/watch?v=GLGrsCr6wzs

*Primary Examiner* — Charles A Fox
*Assistant Examiner* — Joseph J. Sadlon
(74) *Attorney, Agent, or Firm* — Orrick, Herrington & Sutcliffe LLP

(57) ABSTRACT

A construction assembly and methods for making and using the same. The construction assembly includes a plurality of primary structure members each having an S shape including first and second portions respectively defining first and second level recesses. The primary structure members can be in a standing position with the first and second level recesses being respectively proximal to and distal from ground. The first portions can collectively surround and define first level space. The second portions can collectively surround and define second level space greater than the first level space. Advantageously, the construction assembly can provide an efficient space-generating solution. Because of the smaller floor area of the first level space, environmental hazards such as wind, flood or tsunami can exert smaller impact on part of the construction assembly proximal to the ground. Advantageously, the primary structure member can be lightweight, strong and easy to assemble.

18 Claims, 25 Drawing Sheets

(51) Int. Cl.
  *E04B 1/28*   (2006.01)
  *E04B 1/344*  (2006.01)
  *E04B 1/343*  (2006.01)
  *E02D 27/02*  (2006.01)
  *E02D 27/01*  (2006.01)
  *E04C 3/00*   (2006.01)
  *E04H 15/48*  (2006.01)
  *E04B 1/00*   (2006.01)
  *E04F 11/02*  (2006.01)

(52) U.S. Cl.
  CPC ................. *E04B 1/24* (2013.01); *E04B 1/28* (2013.01); *E04B 1/344* (2013.01); *E04B 1/34305* (2013.01); *E04C 3/00* (2013.01); *E02D 2200/1664* (2013.01); *E04B 2001/0053* (2013.01); *E04B 2001/2466* (2013.01); *E04B 2103/06* (2013.01); *E04F 11/02* (2013.01); *E04H 15/48* (2013.01)

(58) Field of Classification Search
  USPC ........................................................... 52/30
  See application file for complete search history.

(56) References Cited

U.S. PATENT DOCUMENTS

| | | | | | |
|---|---|---|---|---|---|
| 3,184,012 | A * | 5/1965 | Ishimoto | ............... | E04B 1/24 52/293.3 |
| 3,324,611 | A * | 6/1967 | Gamber | ............... | E04B 1/161 52/245 |
| 3,541,744 | A * | 11/1970 | Maxwell | ............ | E04B 1/34807 52/73 |
| 3,626,958 | A * | 12/1971 | Ross | ............... | E04H 1/1272 135/147 |
| 3,647,077 | A * | 3/1972 | Gillespie | ............... | A47B 77/14 211/133.5 |
| 3,895,473 | A * | 7/1975 | Fraser | ............... | E04B 1/3404 249/13 |
| 3,921,354 | A * | 11/1975 | Connelly | ............ | E04B 1/3412 52/220.2 |
| 3,970,301 | A * | 7/1976 | Lehmann | ............ | A63B 9/00 482/35 |
| 4,689,932 | A * | 9/1987 | Zeigler | ............... | E04B 1/3211 52/653.1 |
| 5,265,395 | A * | 11/1993 | Lalvani | ............... | B44C 3/123 403/176 |
| 6,073,417 | A * | 6/2000 | Hackett | ............... | E04B 1/00 403/347 |
| 6,763,633 | B2 * | 7/2004 | Cote | ............... | E04B 1/344 135/128 |
| 7,290,378 | B2 * | 11/2007 | Kalnay | ............ | E04B 1/34305 135/126 |
| 7,980,029 | B2 * | 7/2011 | Ahmedy | ............ | E04H 15/52 135/121 |
| 8,099,917 | B2 * | 1/2012 | Stein | ............... | E04B 2/58 52/233 |
| 8,297,014 | B2 * | 10/2012 | Hanumantrao | ......... | E04H 1/04 52/236.4 |
| 8,453,395 | B2 * | 6/2013 | Couture | ............... | E04F 11/02 52/182 |
| 9,382,703 | B2 * | 7/2016 | Quinn | ............... | E04B 1/24 |
| 9,410,312 | B2 * | 8/2016 | Thrall | ............... | E04B 1/34384 |
| 9,857,026 | B1 * | 1/2018 | Hobernnan | ............ | E04B 7/107 |
| 2002/0083654 | A1 * | 7/2002 | Bini | ............... | E04B 1/344 52/66 |

* cited by examiner

CONSTRUCTION ASSEMBLY AND METHOD FOR MAKING AND USING THE SAME

FIELD

The disclosed embodiments relate generally to construction and more particularly, but not exclusively, to construction assemblies and methods for making and using the same.

BACKGROUND

With continuously growing global population, space for living, storage and activities has become more crowded every year. The limitation of space is especially severe in cities. When cities construct buildings to provide needed housing for humans, significant cost and labor is required. The buildings usually have none or limited mobility. Furthermore, the buildings compete with vegetation, such as trees and grass, for land usage. The conflict between buildings and nature is often difficult to resolve. Thus, more buildings constructed usually leads to a less green and less nature-friendly appearance of a city.

In view of the foregoing, a need exists for an improved construction structure that can easily provide space for humans and other occupants and blend with nature.

Figure 1:
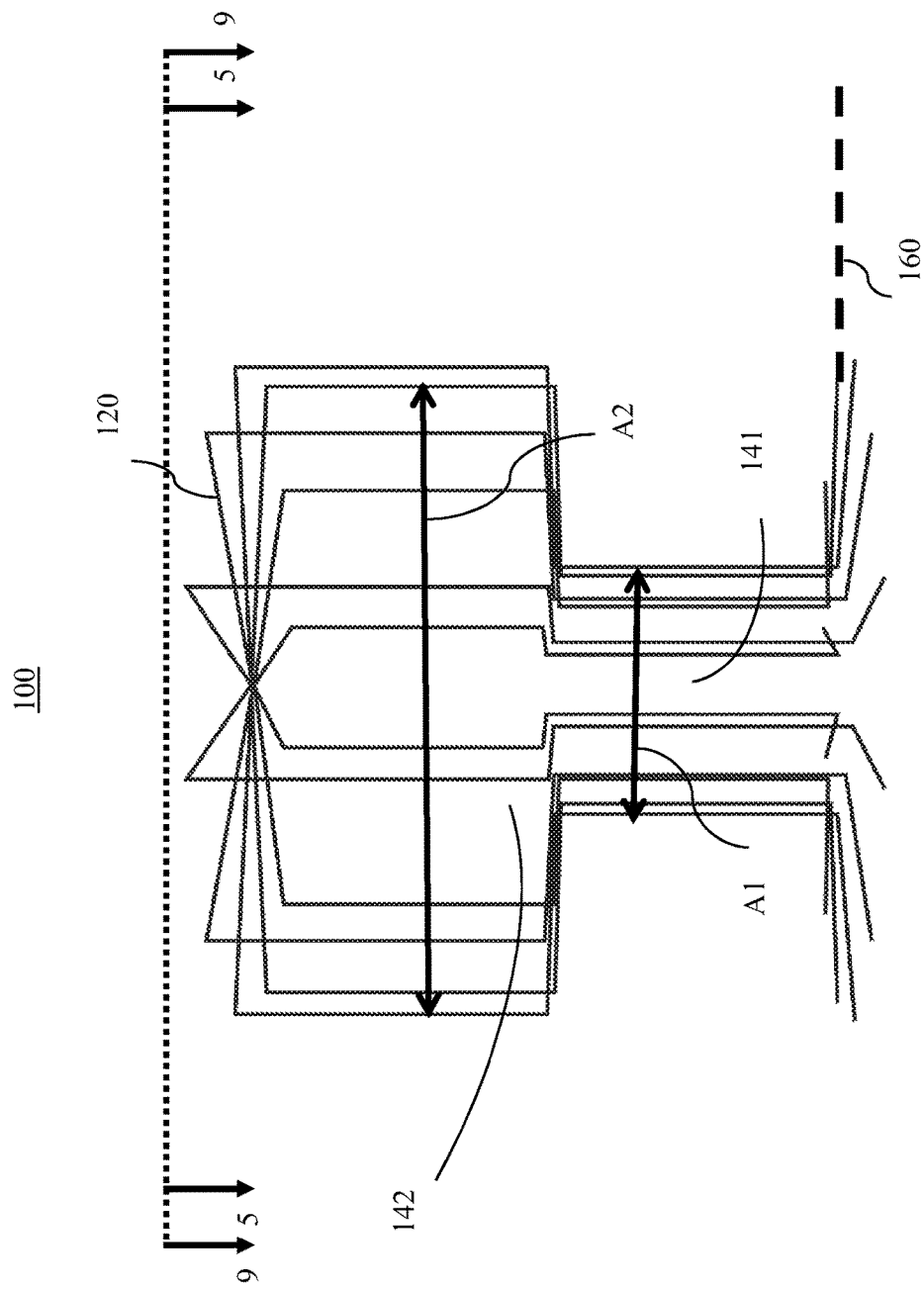
FIG. 1 is an exemplary structure diagram illustrating an embodiment of a construction assembly comprising a plurality of primary structure members.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since currently-available construction structures cannot be built with low cost and labor, and do not blend into nature well, a construction assembly that is easy to build with low cost and possesses an appearance that blends into nature can prove desirable and provide a basis for a wide range of applications, such as rental space, mass transit hubs, resorts, sidewalk space, car charging station, city bike storage, housing, office space, car port, storage, movie projection screen, and sporting events. This result can be achieved, according to one embodiment disclosed herein, by a construction assembly 100 as illustrated in FIG. 1.

The construction assembly 100 in FIG. 1 is shown as including a plurality of primary structure members 120 arranged in a selected pattern on ground 160. The primary structure members 120 is shown as surrounding and defining space including first and second level spaces 141, 142. The first level space 141 is proximal to the ground 160 and the second level space 142 is distal to the ground 160. In other words, the first level space 141 can be disposed between the second level space 142 and the ground.

The first and second level spaces 141, 142 respectively have floor areas A1, A2 each measured parallel to the ground 160. The floor area A1 occupied by the first level space 141 is shown as being smaller than the floor area A2 of the second level space 142. Stated somewhat differently, the construction assembly 100 provides the floor area A2 of second level space 142 that is enlarged relative to floor area A1 of the first level space 141. Advantageously, compared with conventional two-story buildings where typically has the same floor area for each level, the construction assembly 100 can provide a more efficient space-generating solution. Additionally and/or alternatively, because of the smaller floor area A1 of the first level space 141, environmental hazards such as wind, flood or tsunami can exert smaller impact on lower part of the construction assembly 100.

Although the construction assembly 100 in FIG. 1 is shown as including twelve primary structure members 120 for illustrative purposes only, the construction assembly 100 can include any predetermined number of uniform and/or different primary structure members 120, without limitation.

Figure 2:
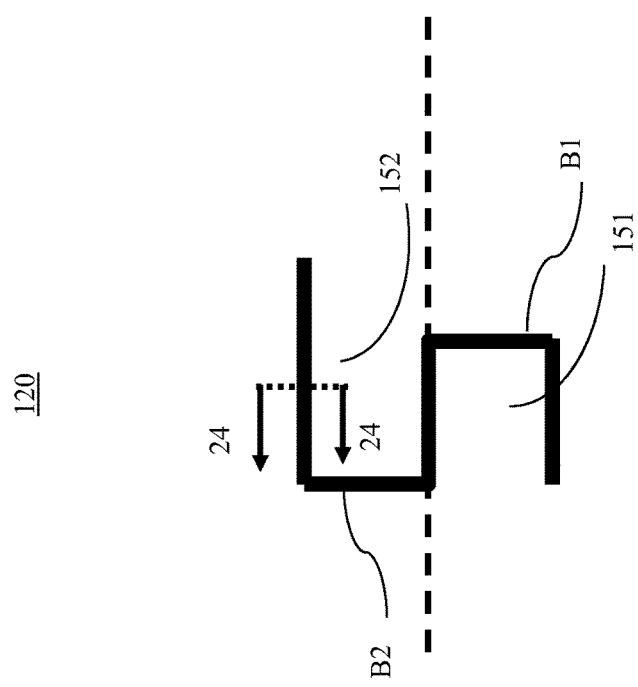
FIG. 2 is an exemplary diagram illustrating an embodiment of one of the primary structure members of FIG. 1, wherein the primary structure member has an S shape.

Turning to FIG. 2, an exemplary primary structure member 120 is shown as having an S shape. The S shape is shown as including a line that is bent into five segments in a zig-zag manner. The primary structure member 120 includes first and second portions B1, B2, respectively defining first and second level recesses 151, 152. The first and second portions B1, B2 can be non-overlapping or at least partially overlapping. The first and second level recesses 151, 152 are defined on opposite sides of the line.

Although the primary structure member 120 is shown in FIG. 2 as including straight line segments for illustrative purposes only, the primary structure member 120 can include any number of uniform and/or different segments each being straight and/or curved, without limitation. Although the first and second level recesses 151, 152 are shown in FIG. 2 as being both rectangular for illustrative purposes only, the first and second level recesses 151, 152 can have uniform and/or different shapes and sizes, without limitation.

Figure 3A:
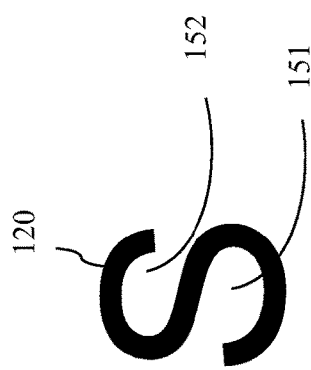
FIG. 3A-3C are exemplary diagrams each illustrating an alternative embodiment of the primary structure member of FIG. 2.
Figure 3C:
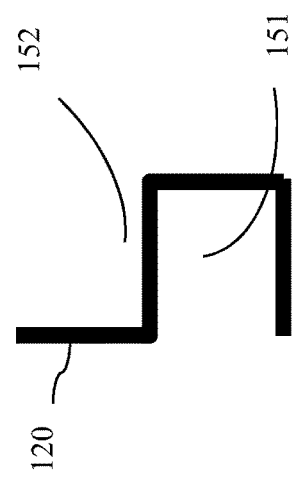
Figure 3B:
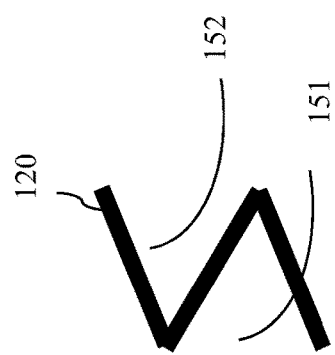

Turning to FIGS. 3A-3C, the exemplary primary structure member 120 is shown FIGS. 3A-3C as having the S shape. FIG. 3A shows the S shape as including a curve that is bent and closely imitate a letter S. FIG. 3B shows the S shape as including a line that is bent into three segments in the zig-zag manner and defines the first and second level recesses 151, 152.

FIG. 3C shows the S shape as including a line that is bent into four segments in the zig-zag manner and defines the first and second level recesses 151, 152. The first and second level recesses 151, 152 are shown as being rectangular and triangular, respectively.

Figure 4:
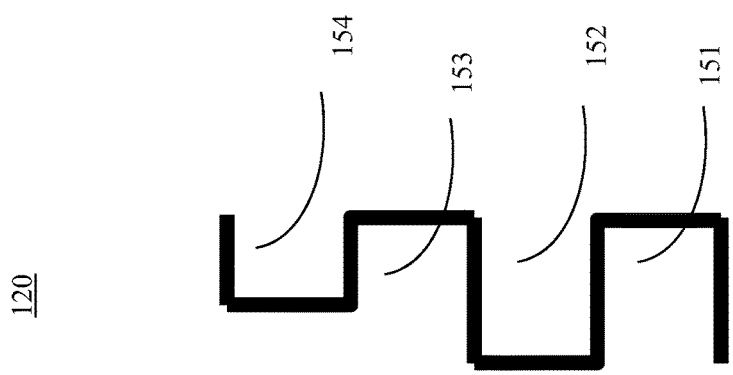
FIG. 4 is an exemplary diagram illustrating another alternative embodiment of the primary structure member of FIG. 2, wherein the primary structure member defines more than two recesses.

Turning to FIG. 4, the exemplary primary structure member 120 is shown as having more than one portion having the S shape. The primary structure member 120 is shown as including a line bent into nine segments in the zig-zag manner and defining the first, second, third and fourth level recesses 151-154. When the plurality of the primary structure member 120 is arranged in the manner as shown in FIG. 1, each of the portions defining first, second, third and fourth level recesses 151-154 can surround a respective level of space.

Figure 5:
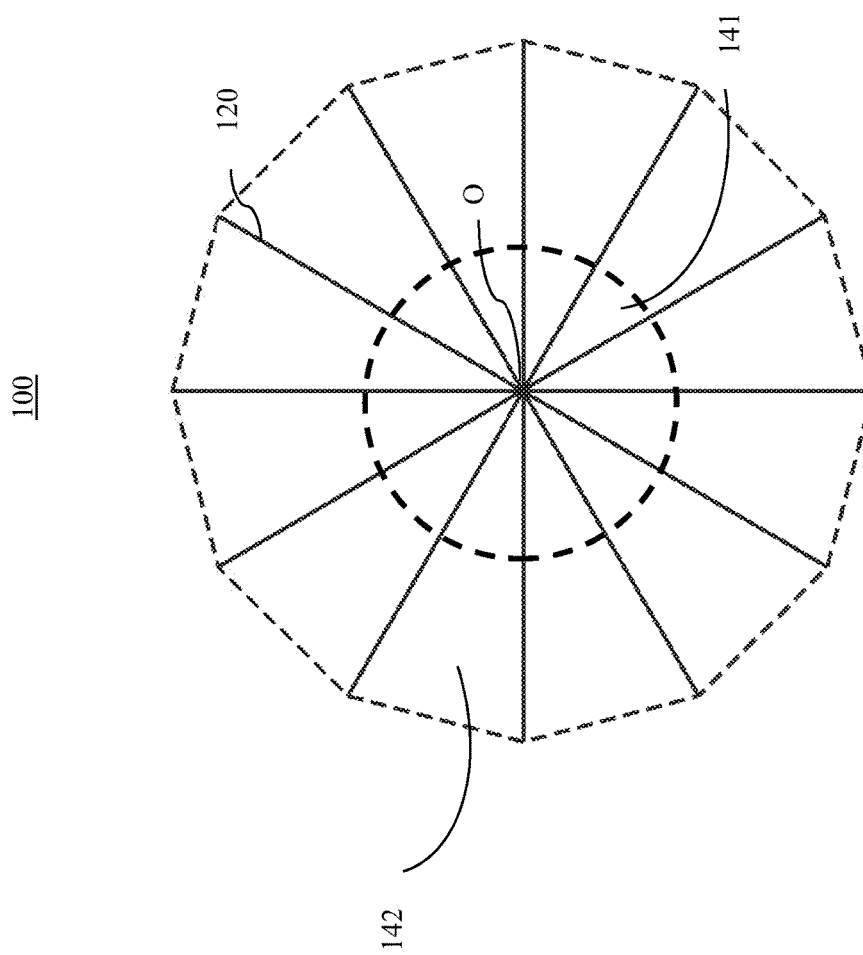
FIG. 5 is an exemplary diagram illustrating an alternative embodiment of the construction assembly of FIG. 1, wherein a top view of the construction assembly is shown.

Turning to FIG. 5, a top view of an embodiment of the construction assembly 100 of FIG. 1 is shown. The primary structure members 120 are shown as extending radially about a center region O. The second level space 142 and the first level space 141 are shown as having an equilateral polygonal shape and as being concentric about the center region O. Stated somewhat differently, angles between every two adjacent primary structure members 120 are the same.

Each pair of the primary structure members 120 that are oppositely located can be joined at the center region O and be mutually supported. Additionally and/or alternatively, each of the primary structure members 120 can be joined with, and supported by, two adjacent primary structure members 120 at the center region O. The primary structure members 120 can thus avoid falling to the ground 160 (shown in FIG. 1). Advantageously, stability of the construction assembly 100 can be ensured.

Although FIG. 5 shows the first and second level spaces 141, 142 having an equilateral polygonal shape for illustrative purposes only, the first and second level spaces 141, 142 can have any regular and/or irregular shapes, without limitation.

Figure 6:
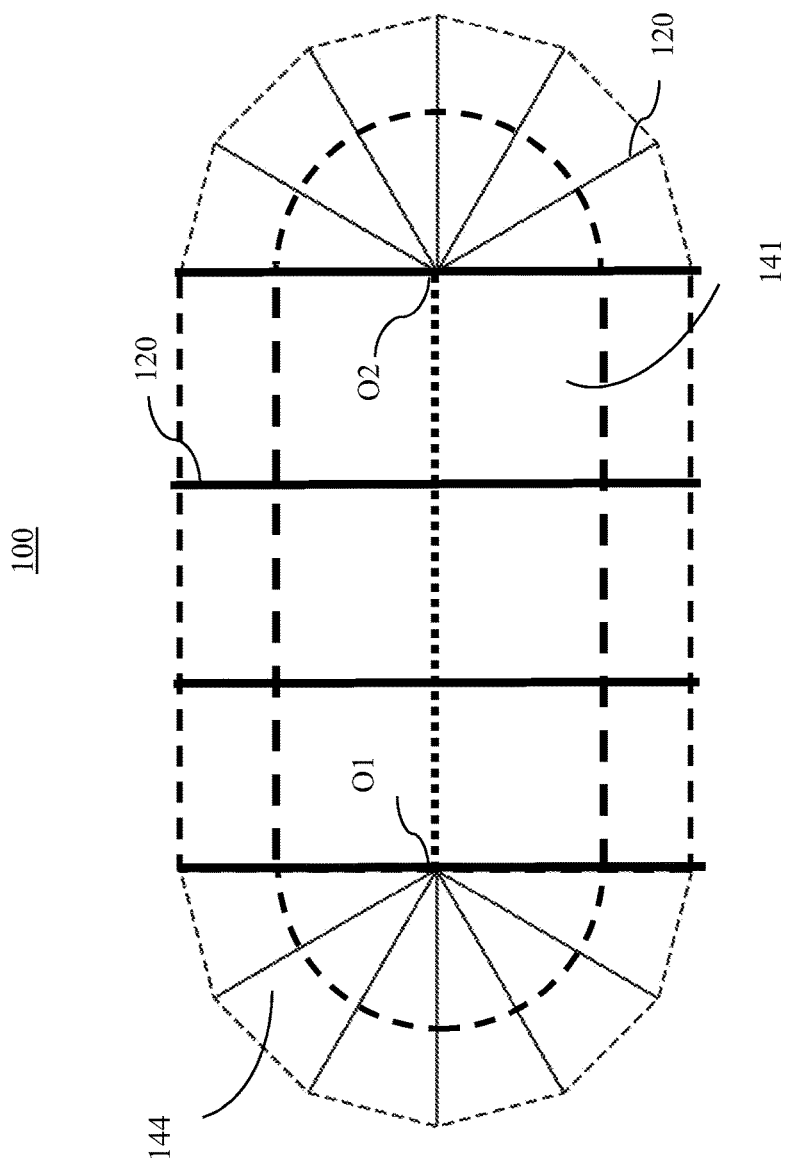
FIG. 6 is an exemplary diagram illustrating another alternative embodiment of the construction assembly of FIG. 1, wherein a top view of the construction assembly has a non-circular shape.

Turning to FIG. 6, a top view of an alternative embodiment of the construction assembly 100 of FIG. 1 is shown. The first and second level spaces 141, 142 are shown as having a shape combining a rectangle and a circle.

The rectangle is shown as being located between two half circles and defined by a 2×4 array of the primary structure members 120. The half circles are each defined by multiple primary structure members 120 arranged radially about the center regions O1, O2.

Figure 7:
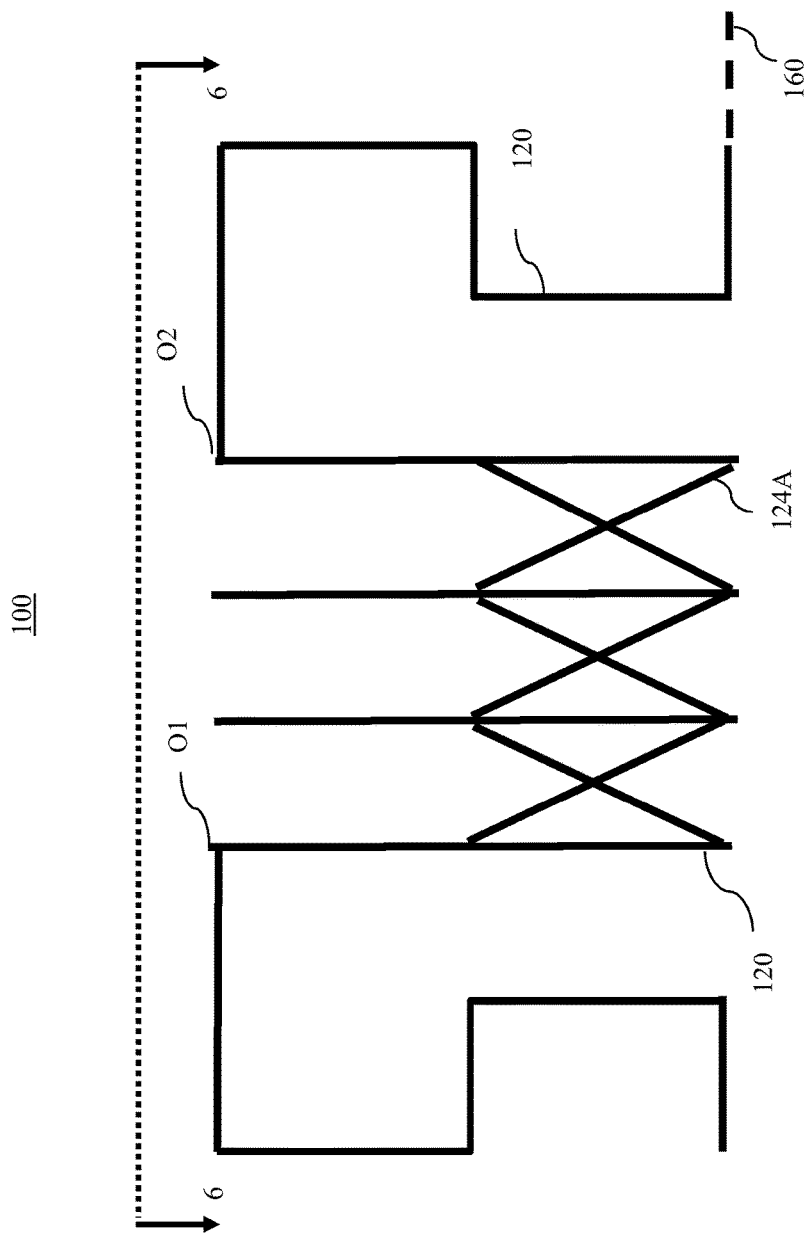
FIG. 7 is an exemplary diagram illustrating an alternative embodiment of the construction assembly of FIG. 6, wherein the construction assembly includes a cross bracing.

Turning to FIG. 7, a side view of the construction assembly 100 of FIG. 6 is shown. A cross bracing 124A is shown as being installed between adjacent primary structure members 120 that are arranged in parallel. The cross bracing 124A can provide support to the parallel primary structure members 120 and prevent the primary structure members 120 from collapsing in a parallel manner, or under domino effect, under the circumstance where one of the primary structure members 120 collapses. Advantageously, stability of the construction assembly 100 can be ensured.

Although FIG. 7 shows the cross bracing 124A as including a pair of diagonal members being installed between every two adjacent primary structure members 120 that are arranged parallel for purposes of illustration only, the cross bracing 124A between the primary structure members 120 can be provided in any suitable manner, without limitation.

Figure 8:
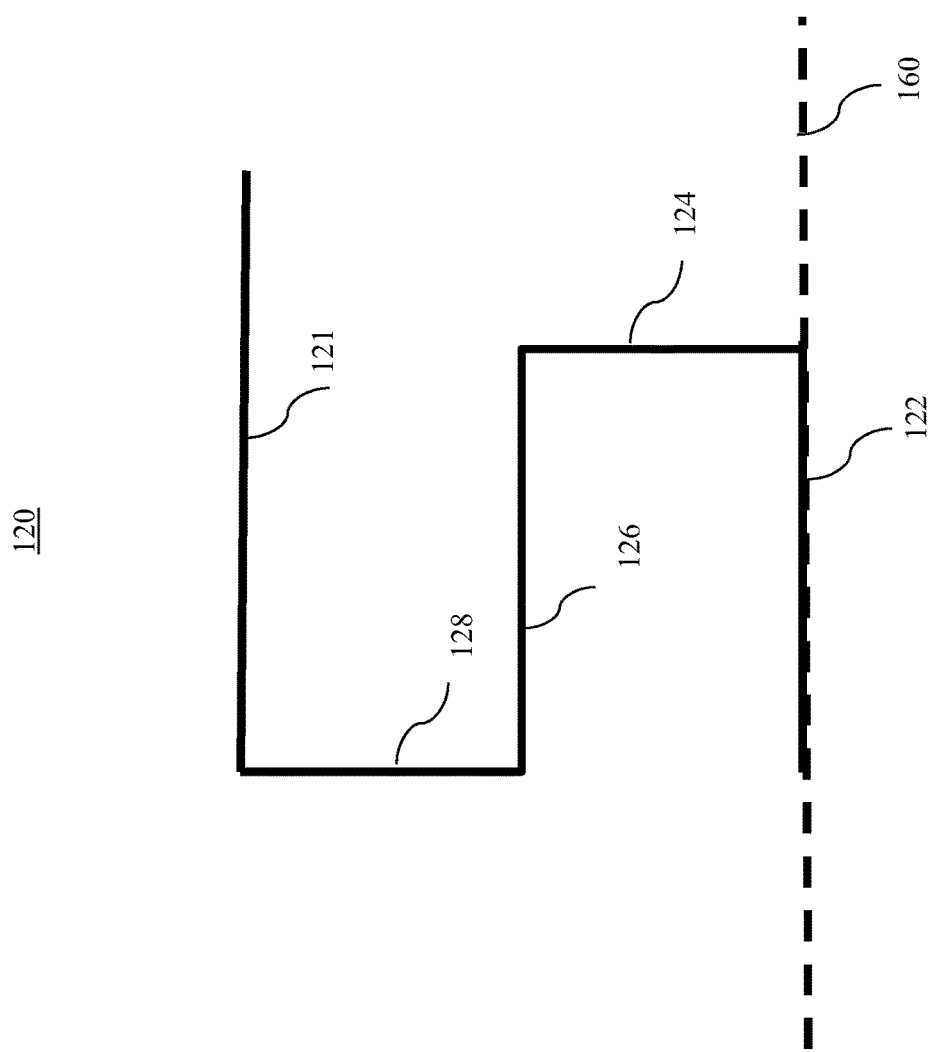
FIG. 8 is an exemplary diagram illustrating another alternative embodiment of the primary structure member of FIG. 2, wherein the primary structure member includes a plurality of portions.

Turning to FIG. 8, an exemplary primary structure member 120 is shown. The primary structure member 120 can include a plurality of portions. The portions includes a first floor portion 122. The first floor portion 122 is shown as being the part of the primary structure member 120 that is adjacent to the ground 160 and/or closest to the ground 160 relative to the other portions of the primary structural member 120. The remaining portions of the primary structure member 120 are located farther from the ground 160 than the first floor portion 122 is. The primary structure member 120 is thus illustrated in FIG. 8 as being configured in a standing position.

The primary structure member 120 is shown as including a first wall portion 124 connected to the first floor portion 122. In the standing position, the first wall portion 124 and the first floor portion 122 can define the floor area A1 (shown in FIG. 1) of the first level space 141 (shown in FIG. 1). The first wall portion 124 can serve as at least a part of a wall of the first level space 141. Optionally, wall panels (not shown) can be installed between adjacent first wall portions 124. Exemplary wall panels can be made of glass, wood, polymer, polyvinyl chloride (PVC), acrylonitrile butadiene styrene (ABS), nylon, high-density polyethylene (HDPE) and/or polypropylene.

The primary structure member 120 is shown as including a second floor portion 126 connected to the first wall portion 124. In the standing position, the second floor portion 126 can serve as at least a part of a floor of the second level space 142 (shown in FIG. 1).

The primary structure member 120 is shown as including a second wall portion 128 connected to the second floor portion 126. The second floor portion 126 thereby can be disposed between the first floor portion 122 and the second wall portion 128. The second wall portion 128 can define the floor area A2 (shown in FIG. 1) of the second level space 142. The second wall portion 128 can serve as at least a part of a wall of the second level space 142. Optionally, the wall panels can be installed between adjacent second wall portions 128.

The primary structure member 120 is shown as including an optional ceiling portion 121 connected to the second wall portion 128. In the standing position, the ceiling portion 121 can serve as at least a part of a ceiling of the second level space 142.

The S-shaped primary structure member 120 can thus have a continuous load path for greater strength with only a small number of connection points. Advantageously, the primary structure member 120 can be lightweight and strong.

Additionally and/or alternatively, the size of the primary structure member 120 can be adjusted. In one embodiment, length of one or more of the portions, including the first and second floor portions 122, 126, the ceiling portion 121 and the first and second wall portions 124, 128, can be respectively adjusted. In one example, a selected portion can have a telescopic pipe structure (or a structure including a plurality of nested pipes). In another example, the selected portion can have one or more pipe leafs that can be inserted into the portion for lengthening the portion. For example, lengths of the first and second wall portions 124, 128 can be respectively adjusted to adjust heights and other dimensions of the first and second level spaces 141, 142, respectively. In another example, length of the second floor portion 126 can be adjusted to adjust the floor area A2 of the second level space 142. Advantageously, size of the construction assembly 100 (shown in FIG. 1) can be adjusted to adapt to a wide variety of applications.

Although FIG. 8 shows the first and second floor portions 122, 126 and the ceiling portion 121 as being parallel to the ground 160, and the first and second wall portions 124, 128 as being vertical to the ground 160 for illustrative purposes only, the first and second floor portions 122, 126, the ceiling portion 121 and the first and second wall portions 124, 128 can be at any uniform and/or different suitable angles relative to the ground 160, without limitation.

Figure 9:
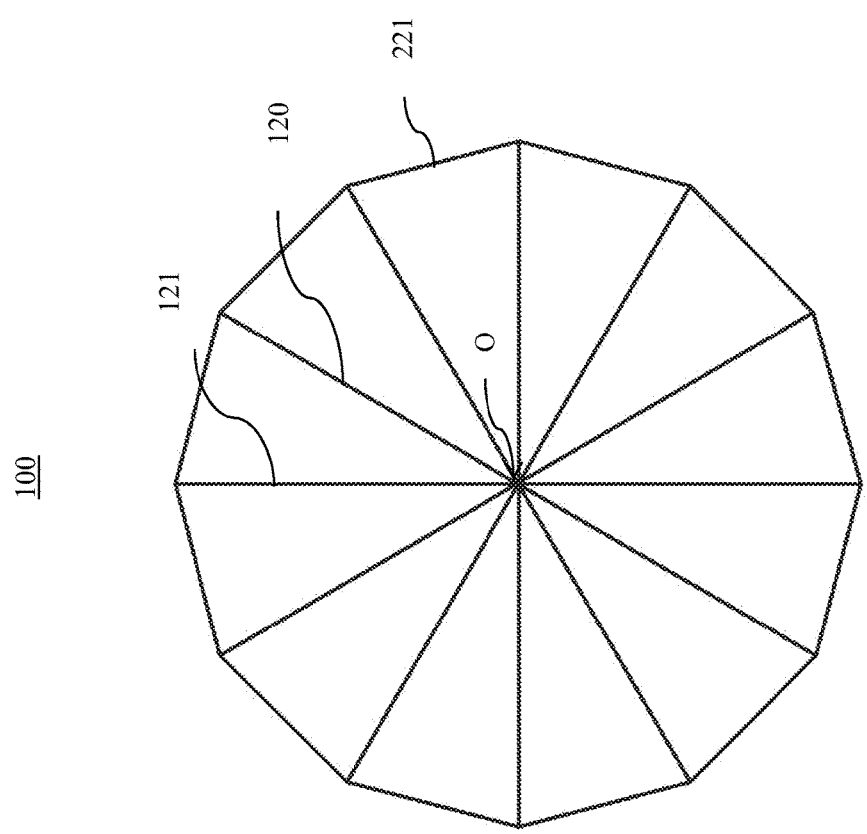
FIG. 9 is an exemplary diagram illustrating another alternative embodiment of the construction assembly of FIG. 1, wherein the construction assembly includes a plurality of ceiling panels.

Turning to FIG. 9, a top view of an exemplary construction assembly 100 is shown. The ceiling portions 121 are shown to be joined at the center region O. The ceiling portions 121 can be joined in any manner, such as being fastened via bolting and/or taping. Additionally and/or alternatively, the ceiling portions 121 can be joined via a mechanical connection such as a cooperating detents including any combination of mating elements, such as blocks, tabs, pockets, slots, ramps, locking pins, cantilevered members, support pins, and the like, that may be selectively or automatically engaged and/or disengaged to couple or decouple the ceiling portions 121.

FIG. 9 shows a ceiling panel 221 as being located between the ceiling portions 121 of every two adjacent primary structure members 120. The ceiling panel 221 can be made of any materials suitable for application of the construction assembly 100. Exemplary ceiling panels 221 can be made of glass, wood, polymer, PVC, ABS, nylon, HDPE, polypropylene, or a combination thereof. The ceiling panels 221 can have a pattern that is solid, mesh, woven, lattice, or a combination thereof. The ceiling panels 221 can be connected to the ceiling portions 121 using any methods such as cooperating detents. Additionally and/or alternatively, the ceiling panels 221 can have solar panels installed thereon for generating electricity to power any electrical appliances on the construction assembly 100.

Although FIG. 9 shows the ceiling panel 221 as being installed between the ceiling portions 121 of every two adjacent primary structure members 120 for illustrative purposes only, none of, or any number of, uniform and/or different ceiling panels 221 can be installed between the ceiling portions 121 of any two selected primary structure members 120, without limitation.

Figure 10:
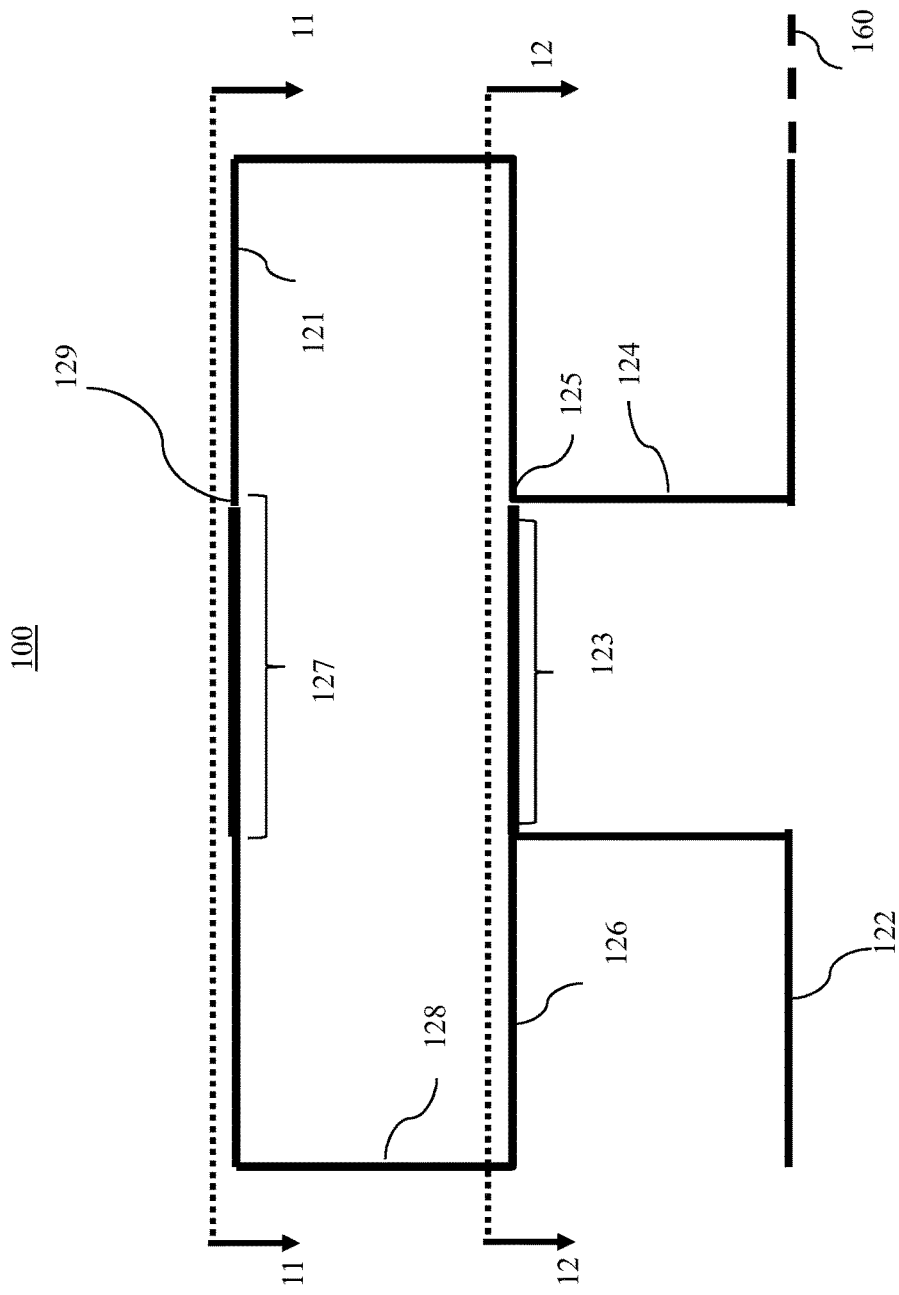
FIG. 10 is an exemplary diagram illustrating another alternative embodiment of the construction assembly of FIG. 1, wherein the construction assembly includes a second level ring and a ceiling ring.

Turning to FIG. 10, each ceiling portion 221 is shown as being terminated at a ceiling terminal region 129. The ceiling terminal regions 129 are shown as being joined at a ceiling ring 127 located centrally to the primary structure members 120.

FIG. 10 shows each second floor portion 126 as being connected to the first wall portion 124 at a second floor terminal region 125. The second floor terminal regions 125 are shown as being joined at a second level ring 123 located centrally to the primary structure members 120.

The ceiling ring 127 and the second level ring 123 can hold the primary structure members 120 together and enhance mutual support among the primary structure members 120. Stability of the construction assembly 100 can advantageously be ensured.

Although FIG. 10 shows the construction assembly 100 as including both the ceiling ring 127 and the second level ring 123 for illustrative purposes only, the construction assembly 100 can include one of, or none of, the ceiling ring 127 and the second level ring 123, without limitation. The ceiling ring 127 and the second level ring 123 can be of uniform and/or different sizes and shapes.

Figure 11:
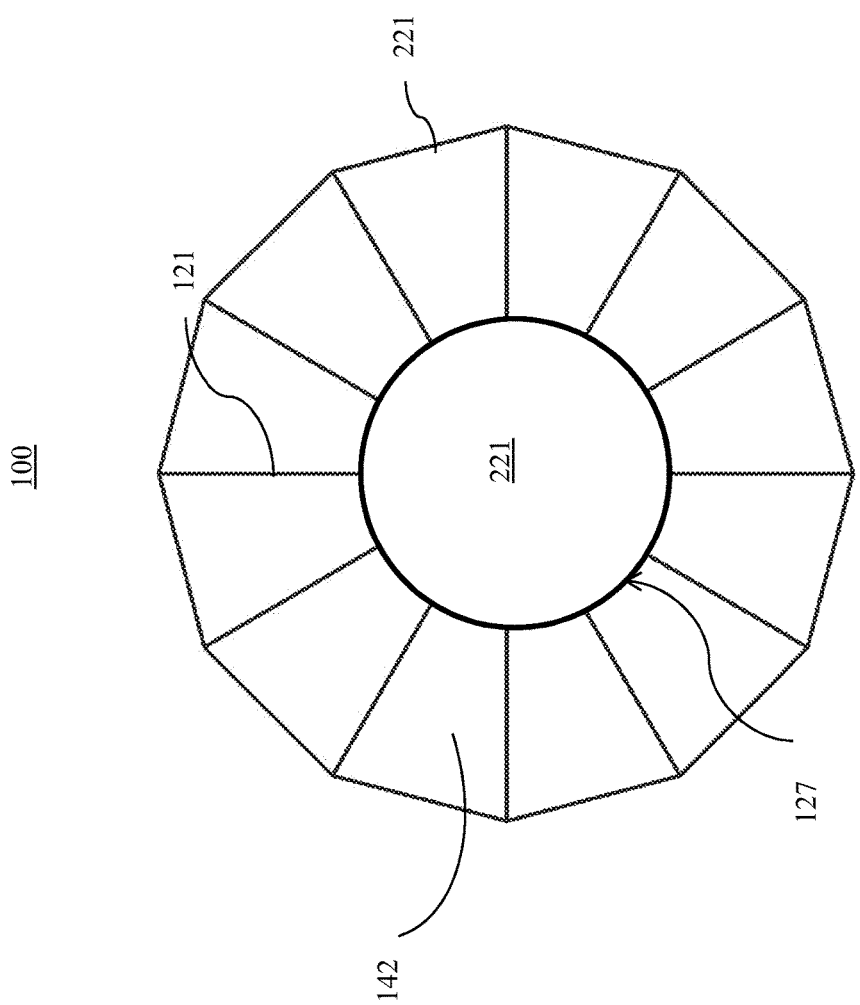
FIG. 11 is an exemplary diagram illustrating an alternative embodiment of the construction assembly of FIG. 10, wherein the construction assembly includes a ceiling panel and the ceiling ring.

Turning to FIG. 11, a top view of an alternative embodiment of the construction assembly 100 of FIG. 10 is shown. The ceiling panel 221 is shown as bordering with the ceiling ring 127. The ceiling panel 221 can be made of any materials suitable for application of the construction assembly 100. The ceiling panels 221 can be connected to the ceiling ring 127 using any methods such as cooperating detents. An optional ceiling panel 221 is shown as being located within the ceiling ring 127.

Figure 12:
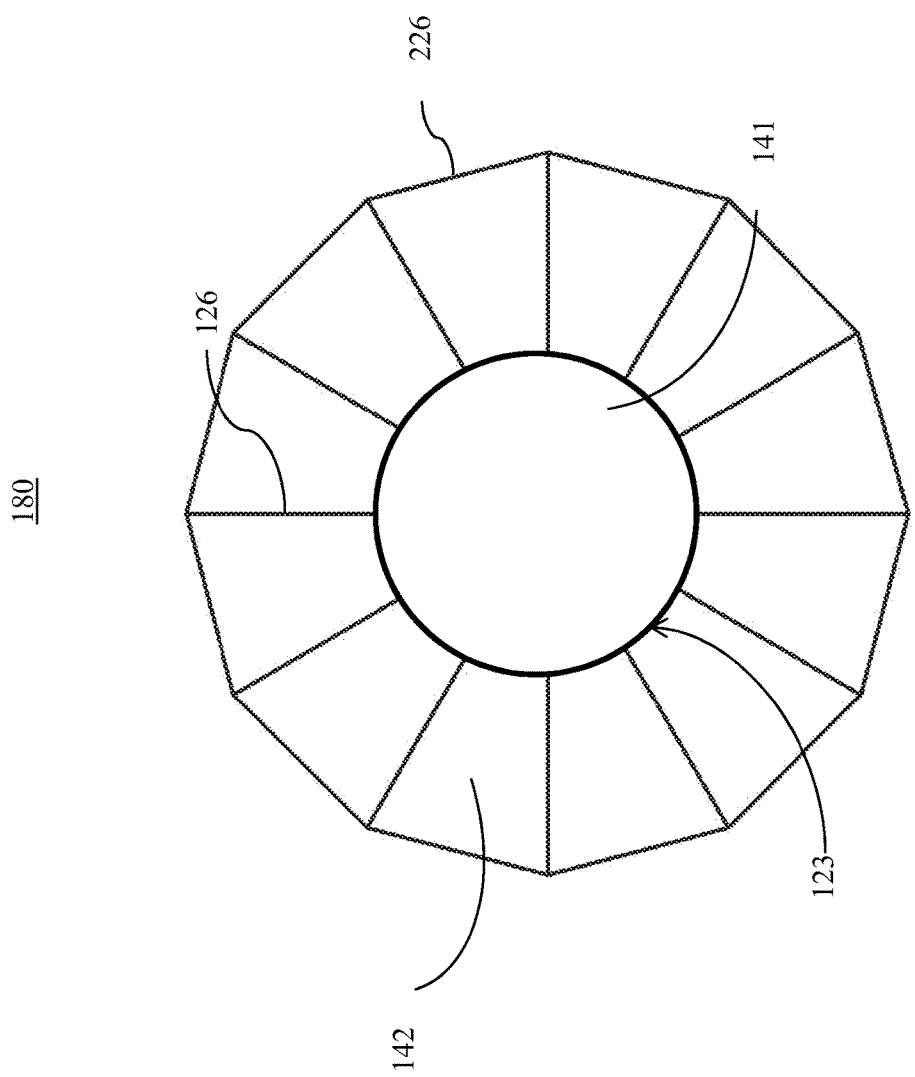
FIG. 12 is an exemplary diagram illustrating another alternative embodiment of the construction assembly of FIG. 10, wherein the construction assembly includes a second floor panel and the second level ring.

Turning to FIG. 12, a top view of another alternative embodiment of the construction assembly 100 is shown. The top view is taken from the perspective of the second level space 142 (shown in FIG. 1). A second floor panel 226 is shown as being located between the second floor portions 126 of every two adjacent primary structure members 120. Stated somewhat differently, the second floor panel 226 can be located between every two adjacent second floor portions 126. The second floor panel 226 is shown as bordering with the second level ring 123.

The second floor panel 226 can be made of any materials suitable for application of the construction assembly 100. Exemplary second floor panels 226 can be made of glass, wood, polymer, or a combination thereof. The second floor panels 226 can have a pattern that is solid, mesh, woven, lattice, or a combination thereof. The second floor panels 226 can be connected to the second floor portions 126 using any methods including, for example, one or more cooperating detents. In one embodiment, the second floor panels 226 and connection among the second floor portions 126, the second floor panels 226 and the second level ring 123 can be sufficiently sturdy such that the second level space 142 can be used as space for storage and/or human living.

Although FIG. 12 shows the second floor panels 226 as being installed between every two adjacent primary structure members 120 for illustrative purposes only, none of, or any number of, uniform and/or different second floor panels 226 can be installed between the second floor panels 226 of any two selected primary structure members 120, without limitation.

Figure 13:
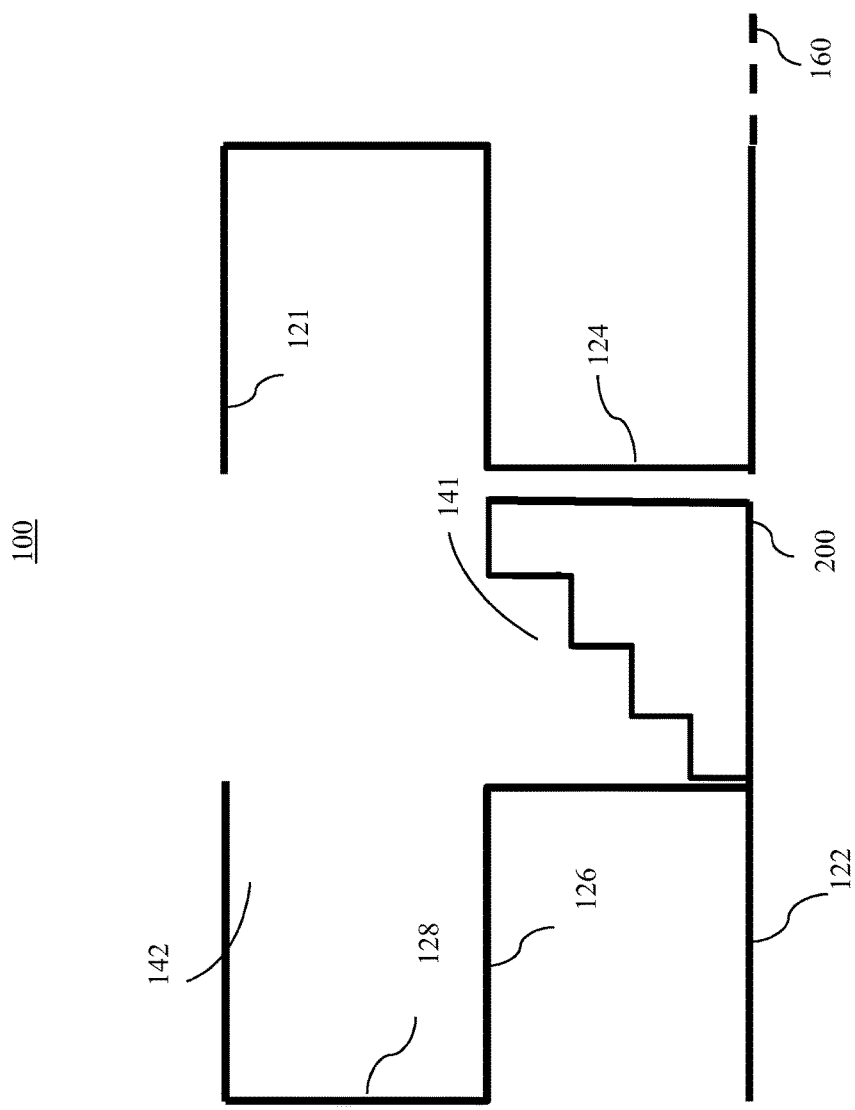
FIG. 13 is an exemplary diagram illustrating another alternative embodiment of the construction assembly of FIG. 1, wherein the construction assembly includes stairs.

Turning to FIG. 13, the construction assembly 100 is shown as including a travel mechanism 200 being located in the first level space 141. The travel mechanism 200 can include any series of steps and can be used for traveling between the first and second level spaces 141, 142. Exemplary travel mechanism 200 can include one or more flights of stairs, ladder, portable stairs, rolling stairs, stepping stool, stair lift, elevator, escalator, or a combination thereof. Additionally and/or alternatively, the travel mechanism 200 can include automated traveling means. Exemplary automated traveling means can include elevator and/or escalator. In example, the automated traveling means can be powered via external power, a battery and/or a solar panel integrated with the construction assembly 100.

Although FIG. 13 shows the travel mechanism 200 as being located in the first level space 141 for illustrative purposes only, additional and/or alternative travel mechanisms 200 can be located outside the first level space 141. For example, the travel mechanism 200 can be located outside the first level space 141 but between the ground 160 and the second level space 142. In another example, the travel mechanism 200 can be located at the periphery of the second wall portion or within the space defined by the first and second wall portions 124, 128.

Figure 14:
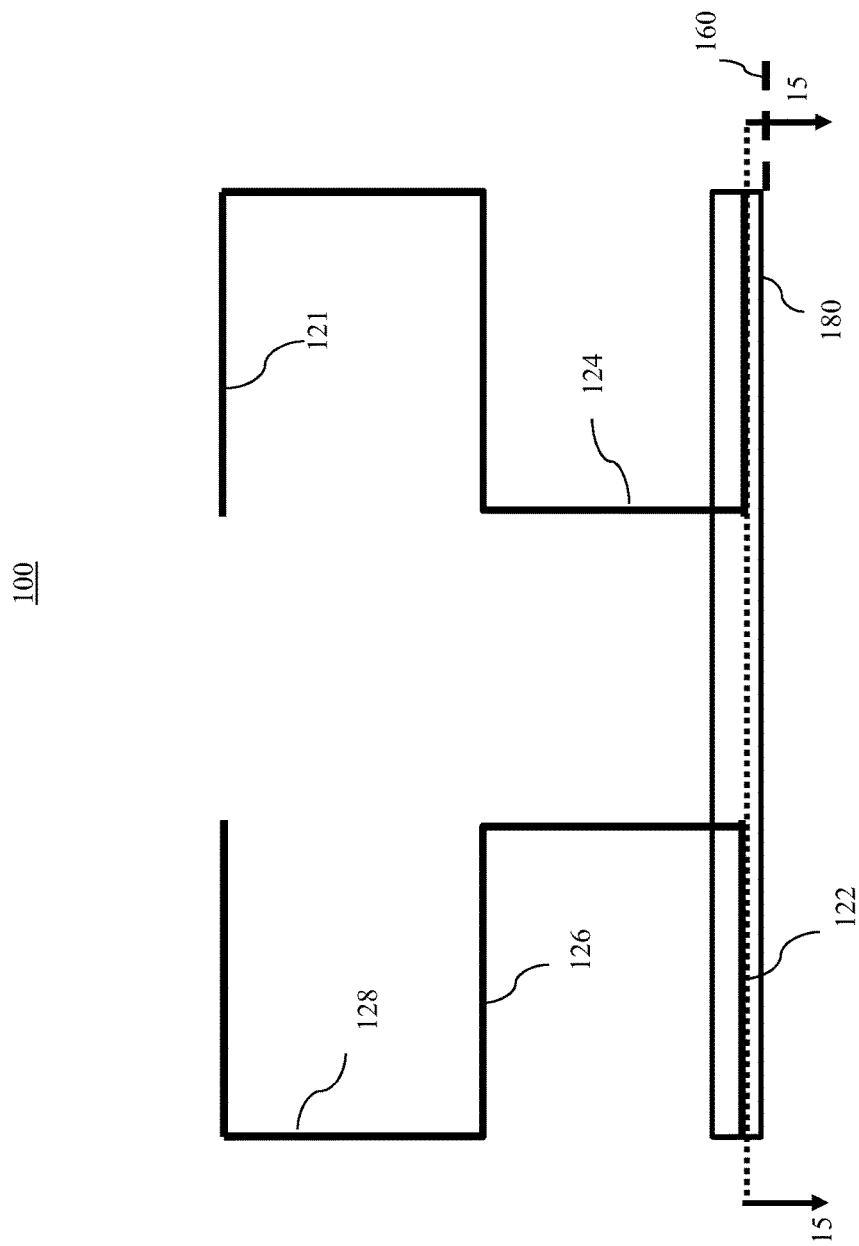
FIG. 14 is an exemplary diagram illustrating another alternative embodiment of the construction assembly of FIG. 1, wherein the construction assembly includes a foundation.

Turning to FIG. 14, the construction assembly 100 is shown as including a foundation 180 on the ground 160 that supports the primary structure members 120. The first floor portion 122 of each primary structure member 120 is shown as being positioned at least partially within the foundation 180. Alternatively, the first floor portion 122 of each primary structure member 120 can be positioned on top of the foundation 180. Exemplary foundation 180 can have a plate-like shape to maximize contact area with the ground 180. Advantageously, stability of the primary structure member 120 can be ensured.

Figure 15:
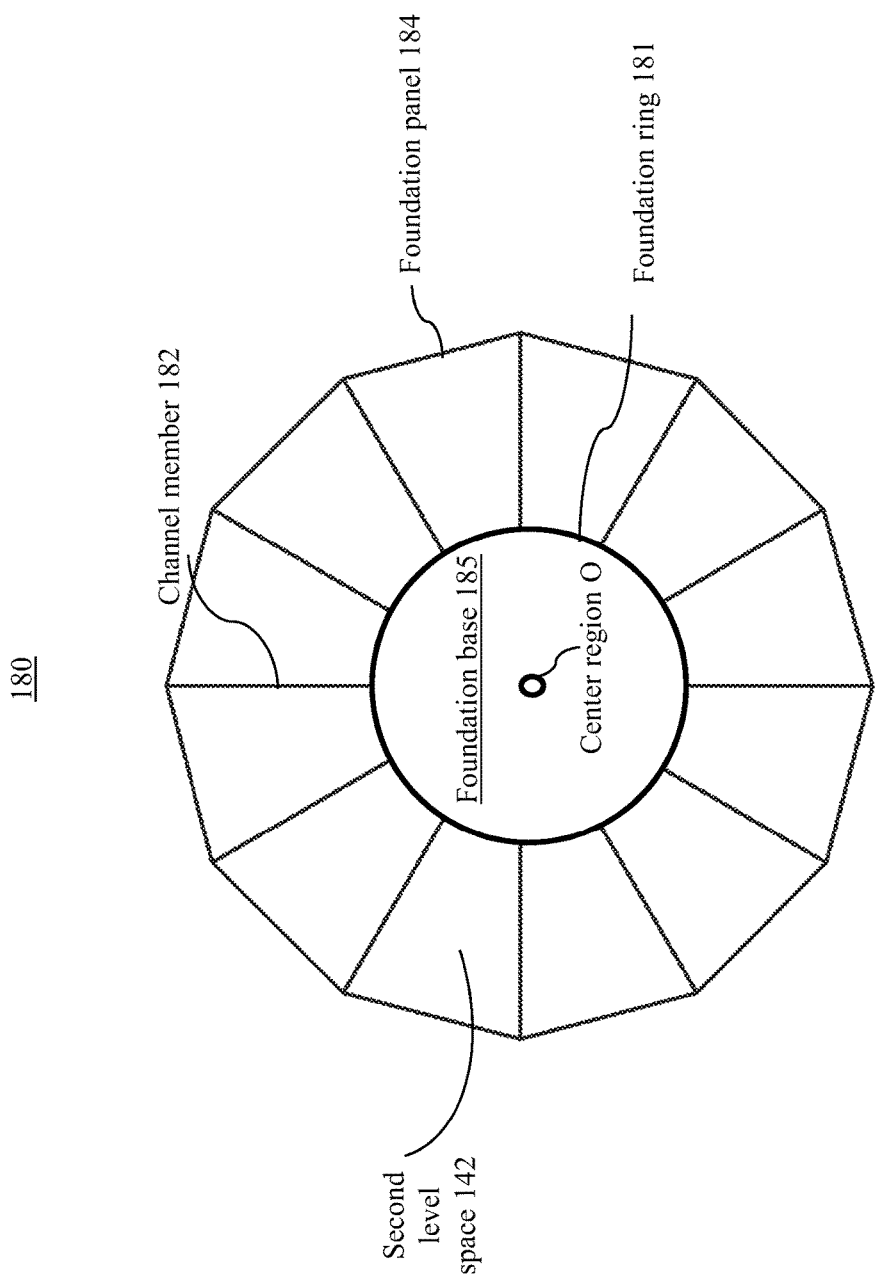
FIG. 15 is an exemplary diagram illustrating an alternative embodiment of the construction assembly of FIG. 14, wherein a top view of the foundation is shown.

Turning to FIG. 15, a top view of an exemplary foundation 180 is shown. The foundation 180 is shown as including a foundation base 185 centered at the center region O and a plurality of channel members 182 coupled to the foundation base 185 and extending radially about the center region O. Exemplary foundation base 185 and channel members 182 can be made of metal. Selected channel members 182 can each be configured to receive a primary structure member 120. Stated somewhat differently, the first floor portion 122 (shown in FIG. 8) of the primary structure member can at least partially rest in the channel member 182. An exemplary channel member 182 can include a metal bar having a U- and/or L-shaped cross section.

The foundation 180 is shown as including a foundation panel 184 located between the every two adjacent channel members 182. Optionally, the foundation 180 can include a foundation ring 181 centered about the center region O and connected with the channel members 182. The foundation panel 184 is shown as bordering with the foundation ring 181.

The foundation panel 184 can be made of any materials that has a significant weight so as to hold the channel members 182 down to the ground 160 (shown in FIG. 14). Advantageously, the foundation 180 can ensure stability of the primary structure member 120 even under high wind conditions. Exemplary foundation panels 184 can be made of wood, concrete, plastic, or a combination thereof. The foundation panel 184 can be connected to the channel members 182 using any methods including, for example, cooperating detents. In one embodiment, the foundation panel 184 and connection among the foundation panel 184, the channel members 182 and the foundation ring 181 can be sufficiently sturdy such that the foundation panel 184 can be used as floor space for storage and/or human activities. Additionally and/or alternatively, each of the foundation panel 184 and/or the channel member 182 can be light and can be lifted by only one or two people. The foundation 180 can advantageously be easy to disassemble, pack, transport and reassemble at a desired site with only limited amount of human labor.

The primary structure members 120, the channel members 182, and the foundation panels 184 can each be light and small such that only one person is needed for transporting the same. In a non-limiting example, to generate the second level space 142 of 200 square feet with 12 primary structure members 120, sides of the foundation panel 184 can be approximately 8 feet and 4 feet, which can be easily handled by one person. The size of the first and second level spaces 141, 142 can be based on the number and size of the primary structure members 120. By varying the number of the primary structure members 120 and/or selecting the size of the primary structure members 120 from a wide range, the first and second level spaces 141, 142 of a wide range of square footage can advantageously be achieved.

Figure 16:
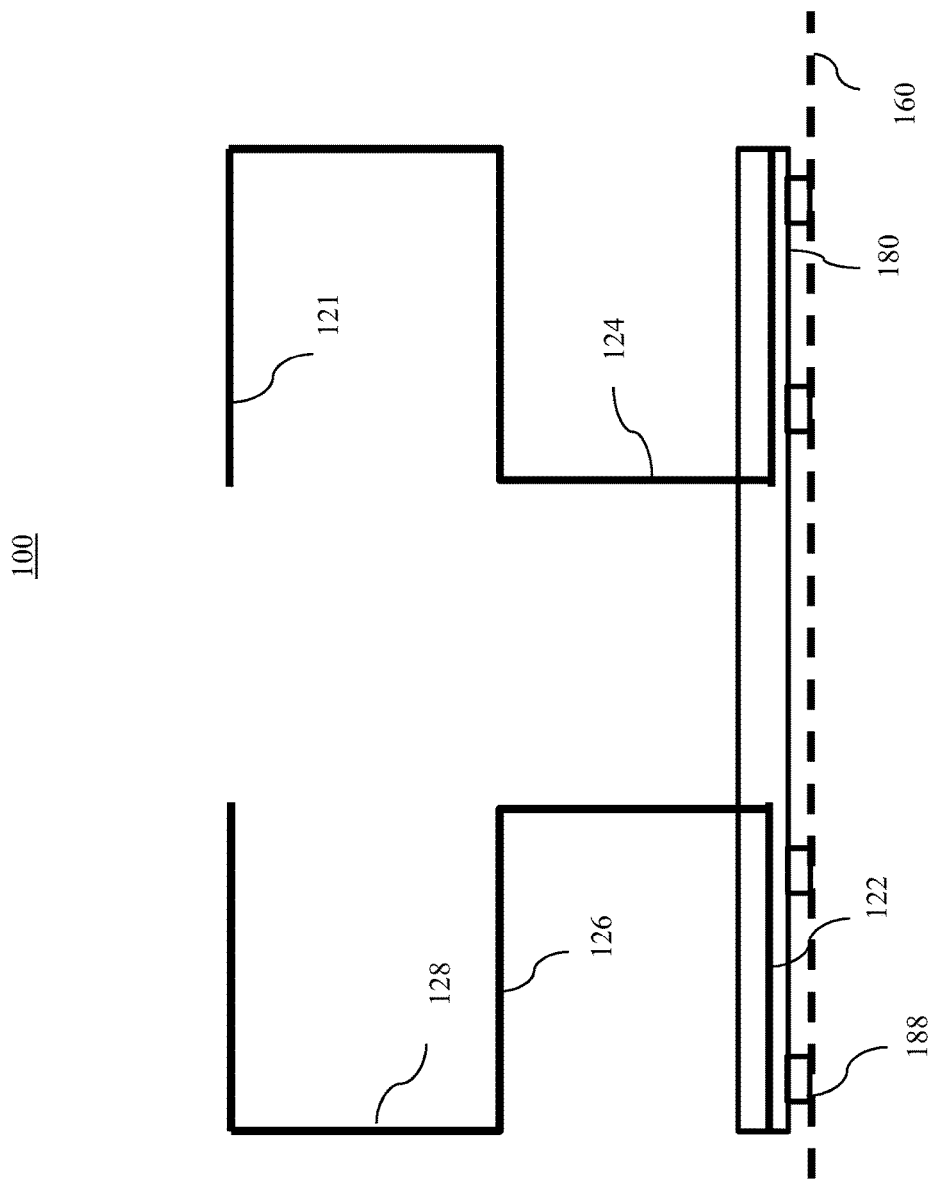
FIG. 16 is an exemplary diagram illustrating another alternative embodiment of the construction assembly of FIG. 14, wherein the foundation includes one or more foundation adjustment members.

Turning to FIG. 16, the foundation 180 is shown as including a plurality of foundation adjustment members 188 located between the ground 160 and the channel member 182. The foundation adjustment member 188 can include a height-adjustable unit that can allow the channel member 182 to match with topography of the ground 160. Additionally and/or alternatively, the foundation adjustment member 188 can adjust the foundation 180 to be aligned with, or be at a selected angle relative to, sea level. Exemplary foundation adjustment member 188 can include wedge, shim, adjustable screw, the hydraulic valve, electrically-controlled actuator, or a combination thereof.

Although FIG. 16 shows two foundation adjustment members 188 connected to each channel member 182 for illustrative purposes only, each channel member 182 can be connected to any number of uniform and/or different foundation adjustment members 188, without limitation.

Figure 17:
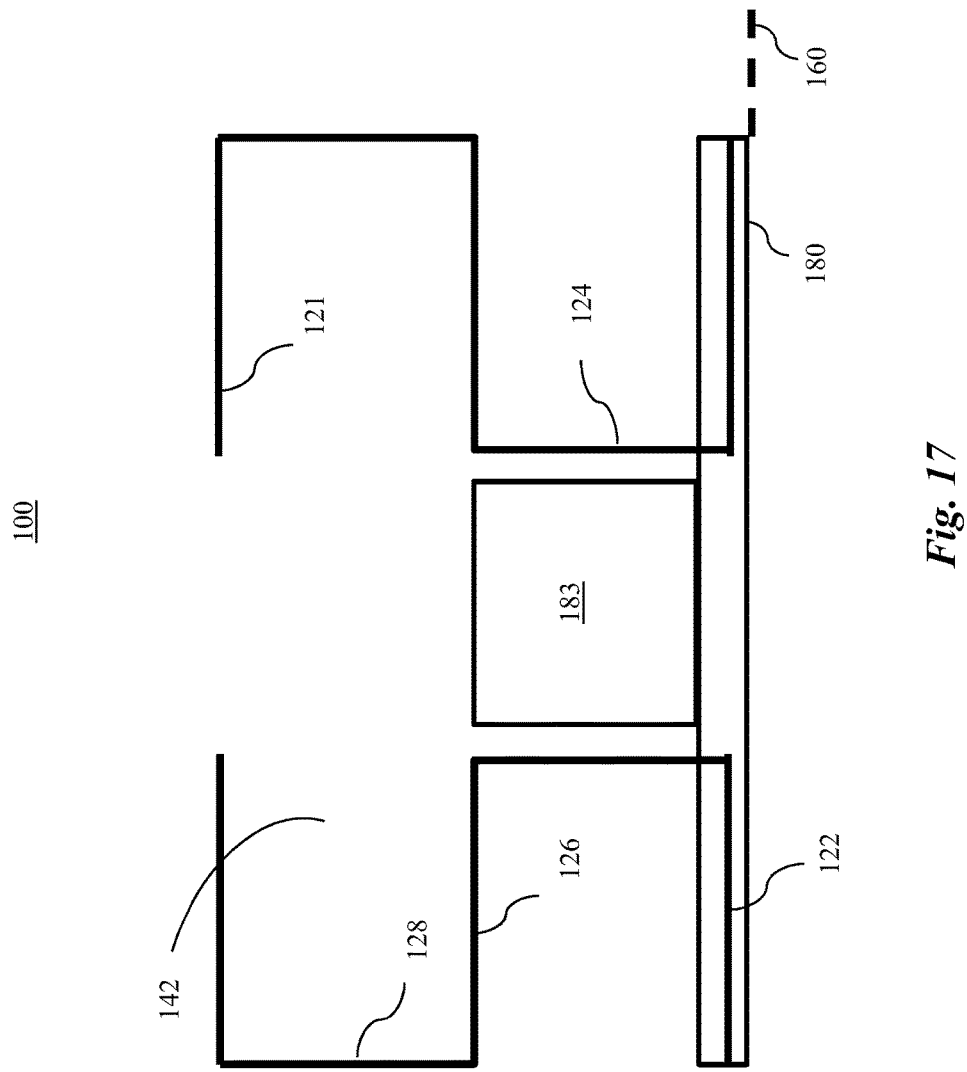
FIG. 17 is an exemplary diagram illustrating another alternative embodiment of the construction assembly of FIG. 14, wherein the construction assembly includes a weight element on the foundation.

Turning to FIG. 17, the construction assembly 100 is shown as including a weight element 183 located in the first level space 141. The weight element 183 can include any substance that has a selected weight. Exemplary weight element 183 can be made of concrete. As shown in FIG. 17, the weight element 183 can be located on the foundation 180. The weight element 183 can increase friction and/or contact between the foundation 180 and the ground 160. Advantageously, stability of the construction assembly 100 can be improved.

Additionally and/or alternatively, the weight element 183 can provide functions including, for example, storage. Exemplary weight element 183 can include a water tank. Advantageously, when the second level space 142 is used for human living, the weight element 183 can provide water and enhance stability of the construction assembly 100. Additionally and/or alternatively, the water can be used as a thermal battery to allow for an efficient heating system in the construction assembly 100.

Figure 18:
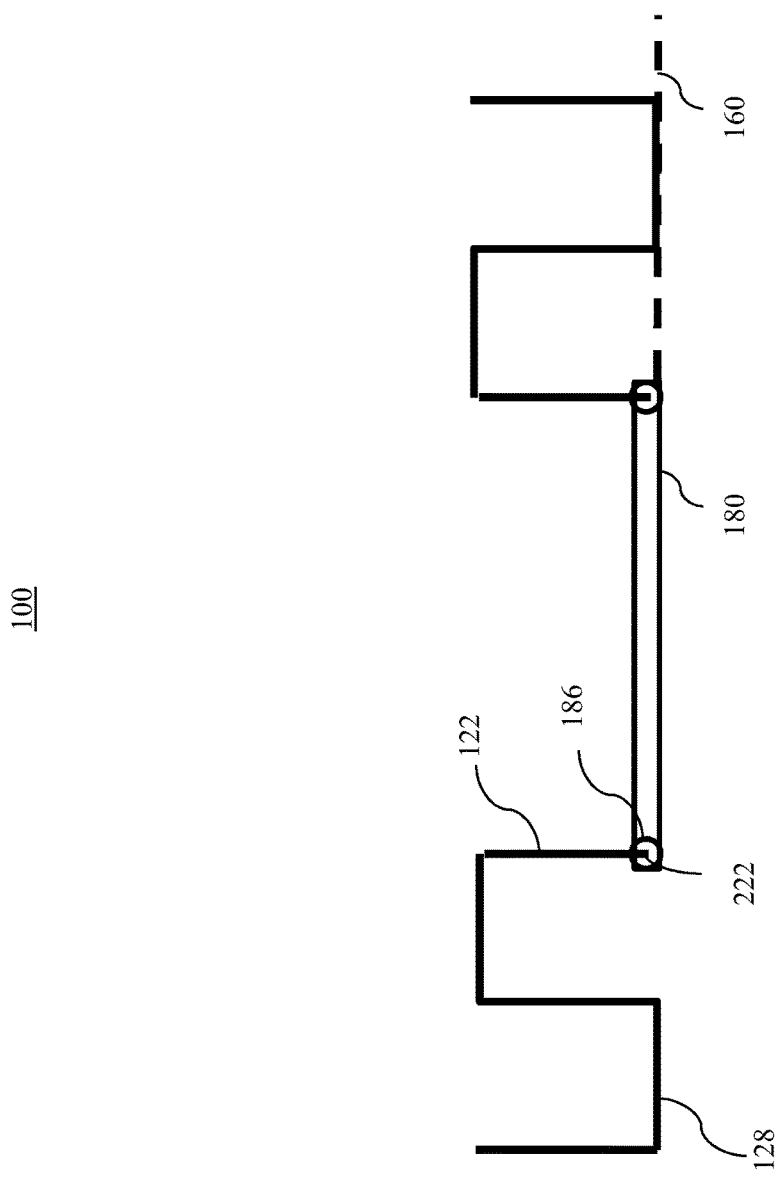
FIG. 18 is an exemplary diagram illustrating another alternative embodiment of the construction assembly of FIG. 14, wherein the primary structure members are in a laying position.

Turning to FIG. 18, the primary structure members 120 are shown as being in a laying position. In the laying position, the second wall portion 128 is shown as at least partially in contact with the ground 160. The first floor portion 122 is shown as being terminated at a base terminal region 222. The base terminal region 222 is shown as being rotatably coupled to the foundation 180 at a pivot point region 186. Thus, the base terminal region 222 and the second wall portion 128 are both contacting the ground 160 and/or the foundation 180. Stated somewhat differently, in the laying position, at least two non-continuous portions of the S shape are in contact with the ground 160 and/or the foundation 180. In contrast, in the standing position (shown in FIG. 8), only one portion of the S shape is in contact with the ground 160 and/or the foundation 180.

In the laying position, the construction assembly 100 can be used as framework for certain activities such as a booth for a market place, tent, and/or temporary housing.

Figure 19:
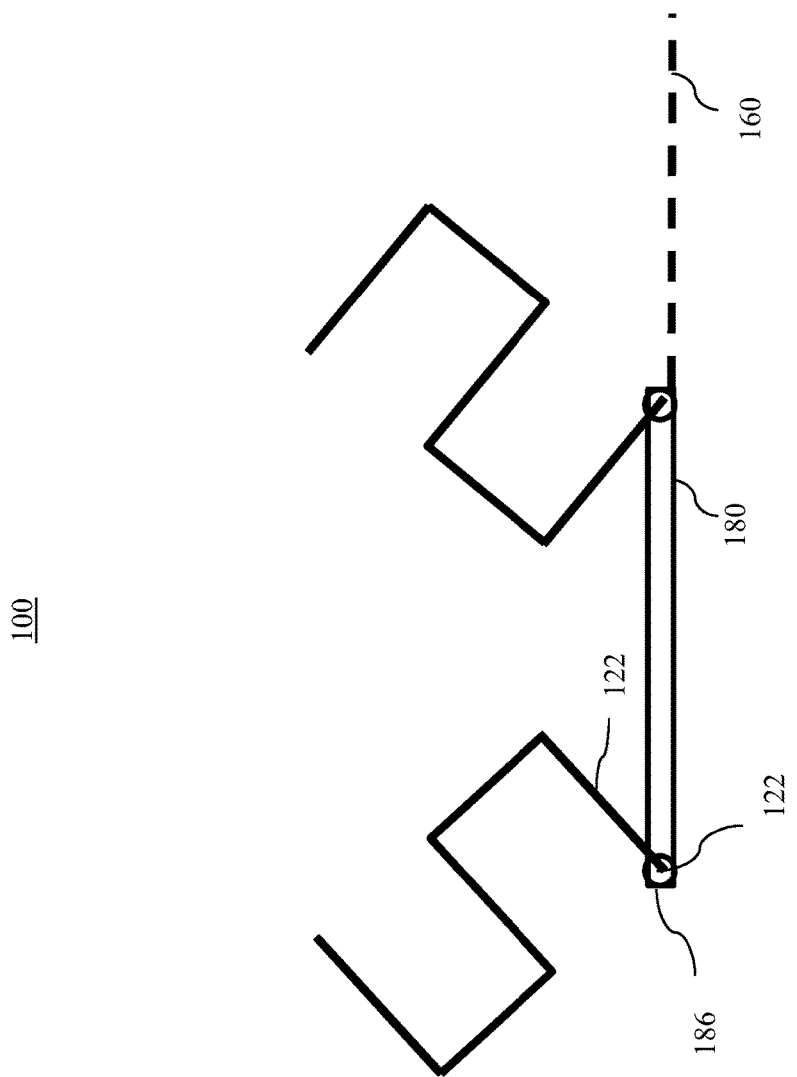
FIG. 19 is an exemplary diagram illustrating another alternative embodiment of the construction assembly of FIG. 14, wherein the primary structure members are in a transition position.

Turning to FIG. 19, each of the primary structure members 120 is shown as being rotated relative to the foundation 180 and about the pivot point region 186. The primary structure members 120 thereby can transition between the laying position (shown in FIG. 18) and the standing position (shown in FIG. 8). Stated somewhat differently, prior to reaching the standing position after moving away from the laying position, the primary structure members 120 is in a transition position. In one embodiment, each of the primary structure members 120 can be lightweight such that one person can lift and pivot the primary structure members 120. An exemplary primary structure member 120 can have a weight ranging from 50 to 70 pounds, or less than 50 pounds. The construction assembly 100 can advantageously be easy to pack, transport and set up at a desired site with only limited amount of human labor.

Optionally, appropriate support structures (not shown) can be applied such that the primary structure members 120 can be fixed and supported in the transition position for certain applications. Additionally and/or alternatively, the various portions of the primary structure members 120 can be positioned at acute and/or obtuse angles, as needed, to adapt to requirements of appearance and strength of the transition position.

Although FIG. 19 shows all primary structure members 120 as being pivoted simultaneously for illustrative purposes only, the primary structure members 120 can be pivoted at uniform and/or different times, without limitation. For example, in certain applications, one or more selected primary structure members 120 can remain in the laying position and other primary structure members 120 can be pivoted relative to the foundation 180 and/or the ground 160.

Figure 20:
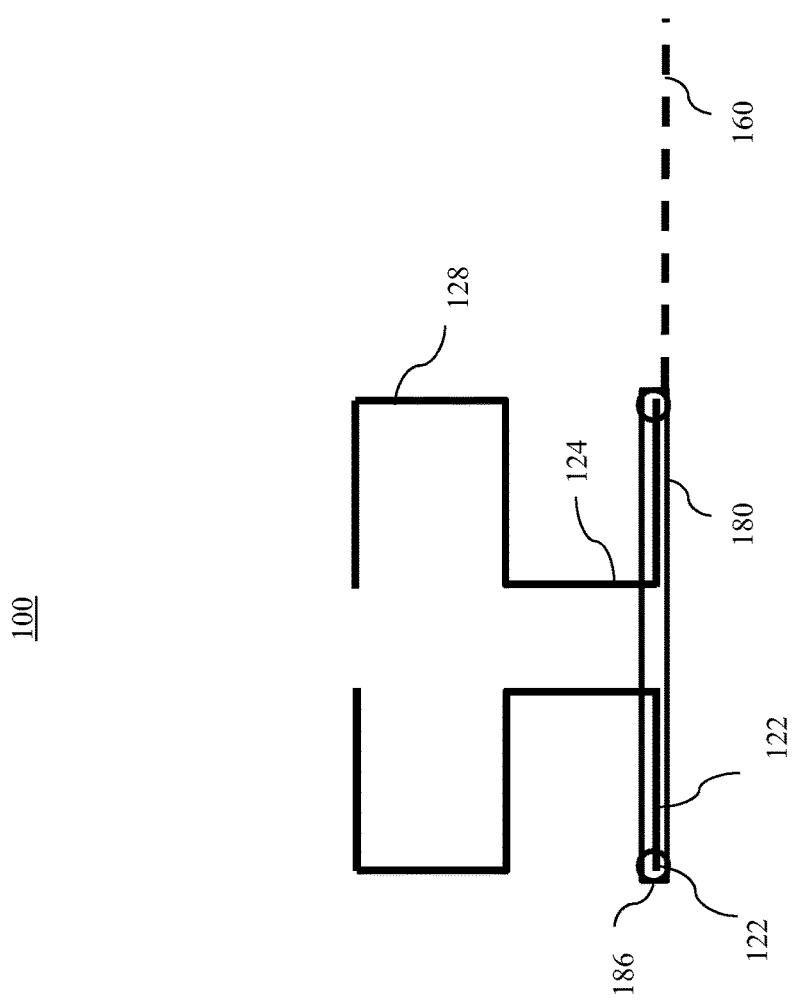
FIG. 20 is an exemplary diagram illustrating another alternative embodiment of the construction assembly of FIG. 14, wherein the primary structure members are in a standing position.

Turning to FIG. 20, each of the primary structure members 120 is shown as being in the standing position. The primary structure members 120 can thus establish a framework that can be optionally strengthened for a selected application. In some embodiments, the primary structure members 120 can be strengthened in the manners discussed in more detail above. For example, the ceiling ring 127 (shown in FIG. 11), the second level ring 123 (shown in FIG. 12) and/or the cross bracing 124A (shown in FIG. 7) can be installed. Additionally and/or alternatively, one or more plants can be hung to the primary structure members 120 to provide color of a tree. The construction assembly 100 thereby can advantageously blend into nature.

Additionally and/or alternatively, the ceiling panel 221 (shown in FIG. 11) and/or the second floor panel 226 (shown in FIG. 12) can be installed, the construction assembly 100 can thus be used as a living unit. Additionally and/or alternatively, selected facilities, such as a bar table, can be fixed to the first wall portion 124 to ease human activity surrounding the construction assembly 100. Additionally and/or alternatively, devices can be installed on the construction assembly 100 for providing and/or collecting data. For example, data sensor, such as camera, can be installed on the second wall portion 128. The data sensor can perform data collection including, but not limited to, people counting, people movement monitoring, vehicle movement monitoring, pollution monitoring, weather monitoring. The data sensor can include various other smart city sensors yet to be developed. Exemplary data sensor can be based on radio-frequency identification (RFID), Wi-Fi, Bluetooth, lighting, and/or the like. In another example, a flexible display screen can be installed to surround some or all of the second wall portions 128. The construction assembly 100 can provide informational display for the public, provide advertising, and/or function as a point for interaction by the public. In yet another example, light source can be installed on the construction assembly 100 to provide illumination.

Conversion between the standing position and the laying position (shown in FIG. 18) can realize a significant change in land areas that the construction assembly 100 spans. For example, in a top view, land area spanned by the construction assembly 100 in the laying position can be greater than the land area spanned by the construction assembly 100 in the standing position by a space transformation factor, for example, ranging from tens to hundreds, or more than hundreds, or less than tens. Advantageously, the construction assembly 100 can adapt to a wide variety of applications.

Figure 21:
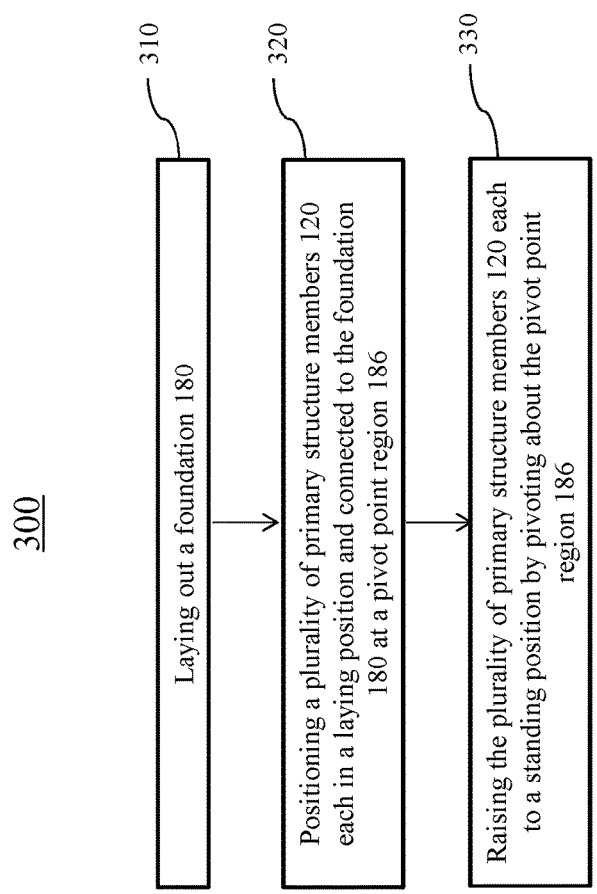
FIG. 21 is an exemplary top-level flow chart illustrating an embodiment of a method for using the construction assembly of FIG. 1.

Turning to FIG. 21, an exemplary method 300 for using the construction assembly 100 is shown. The foundation 180 can be laid out, at 310, on the ground 160. The plurality of primary structure members 120 can be each positioned, at 320, in the laying position and connected to the foundation 180 at the pivot point region 186. The plurality of primary structure members 120 can each be raised, at 330, to the standing position by pivoting about the pivot point region 186. Assembling of the construction assembly 100 can advantageously be fast and requires low cost and low skill of labor.

Optionally, utilities can be installed on the construction assembly 100 to allow various applications. Exemplary utilities can include off-the grid waste water systems, such as aerobic treatment above the ground 160, incinerator, self-contained composting systems, dry flush, and advanced septic systems below the ground 160. Exemplary utilities can include pollution filtering systems (such as smog removal wall or carbon dioxide scrubbing wall), solar panels, micro turbines for electrical power generation, atmospheric water generation, water tank on the foundation 180, Optionally, to convert the construction assembly 100 back to the laying position, the plurality of primary structure members 120 can each be lowered to the laying position by pivoting about the pivot point region 186. The plurality of primary structure members 120 can be removed from the foundation 180 for storage and transportation.

Figure 22:
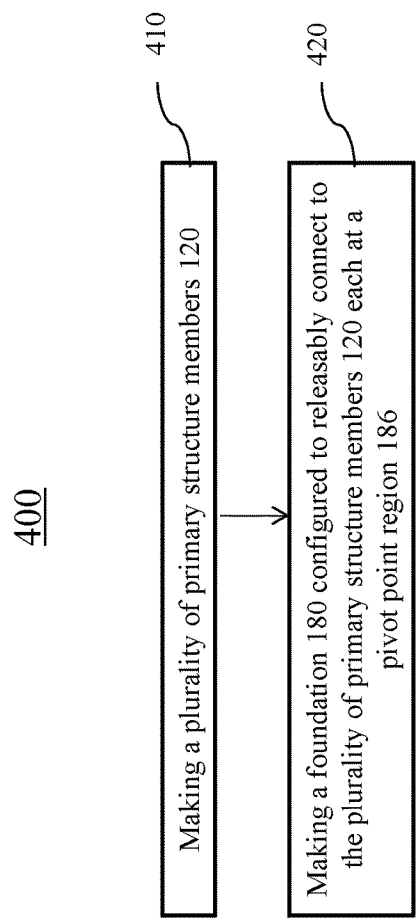
FIG. 22 is an exemplary top-level flow chart illustrating an embodiment of a method for making the construction assembly of FIG. 1.

Turning to FIG. 22, an exemplary method 400 for making the construction assembly 100 is shown. The plurality of primary structure members 120 can be made, at 410. The foundation 180 can be made, at 420. The foundation 180 can be configured to releasably connect to the plurality of primary structure members 120 each at the pivot point region 186. Optionally, the foundation 180 can be connected to the plurality of primary structure members 120 each at the pivot point region 186 to allow erecting of the primary structure members 120.

The primary structure members 120 and the foundation 180 can be made by any uniform and/or different methods. Exemplary methods can include three-dimensional (3D) printing, machine cut, computer numerical control (CNC) cutting, plasma cutting, injection molding, stamping metal, robotic welding, and/or casting. Advantageously, the disclosed manufacturing methods can realize reduced labor cost, easy customization, great precision, increased manufacturing speed and allow for small fabrication facilities.

Figure 23:
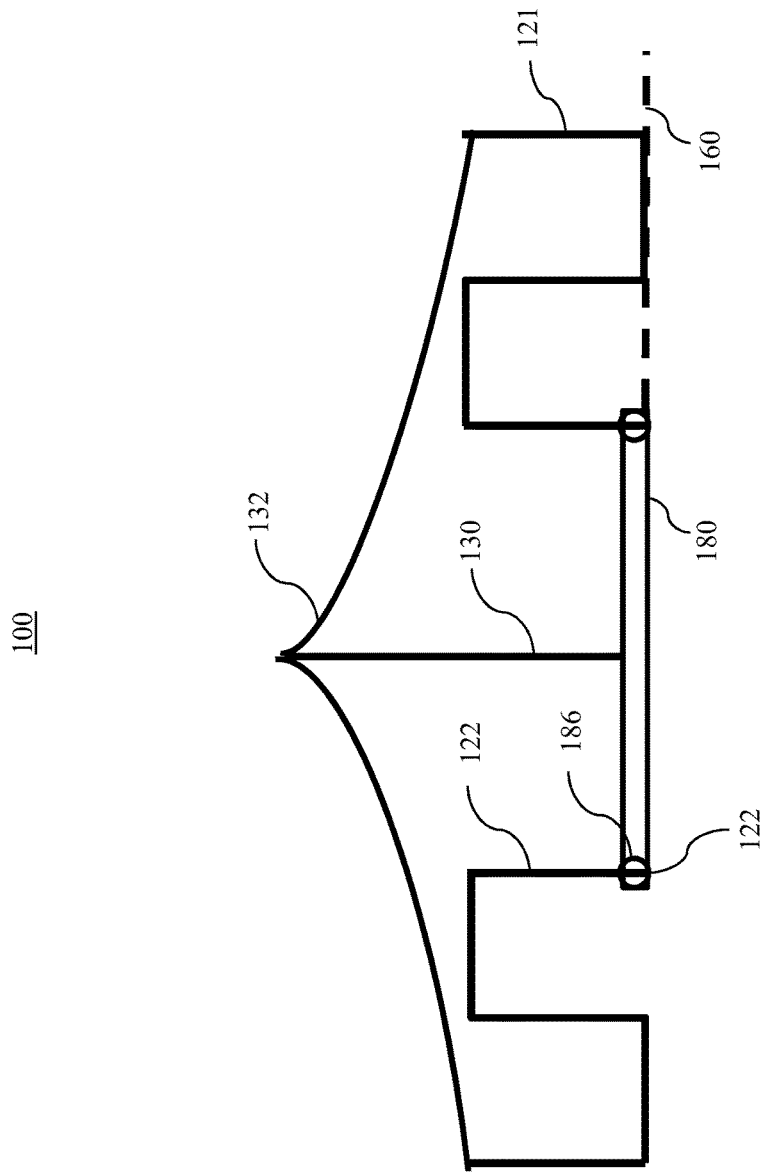
FIG. 23 is an exemplary diagram illustrating an alternative embodiment of the construction assembly of FIG. 18, wherein the construction assembly includes a cover.

Turning to FIG. 23, the construction assembly 100 is shown as including a support post 130 disposed on the foundation 180. A cover 132 is shown as being connected to the support post 130 and the ceiling portion 121. The cover 132 can at least partially cover and/or enclose the construction assembly 100. The construction assembly 100 can thus form a tent for camping and/or other activities. The cover 132 can include any suitable type of cloth, for example.

Although FIG. 23 shows the cover 132 as being connected to the support post 130 and the ceiling portion 121, the cover 132 can be connected to any selected positions on any additional and/or alternative portions of the primary structure members 120, without limitation.

Figure 24:
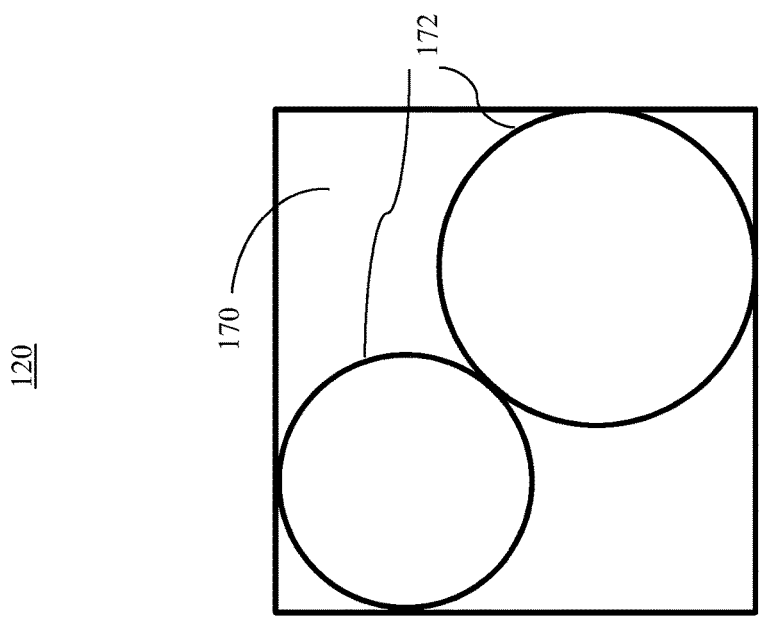
FIG. 24 is an exemplary diagram illustrating another alternative embodiment of the primary structure member of FIG. 2, wherein the primary structure member defines a cavity.

Turning to FIG. 24, a cross section of an exemplary primary structure members 120 is shown. The primary structure members 120 is shown as being hollow and defining a cavity 170. The cavity 170 can accommodate one or more conduits 172. Each conduit 172 can carry a selected supply and/or utility, respectively. For example, the conduit 172 can transport water, electricity, gas, air conditioning, or heat. The conduit 172 can include cables for television signal, cables for wired communication, telephone cables, or a combination thereof. The conduit 172 can thus be coupled with various utilities installed on the construction assembly 100 for convenience of occupants.

Advantageously, the primary structure members 120 can provide both structure of the construction assembly 100 and functions for utilizing the construction assembly 100. Because the conduit 172 can be concealed within the primary structure members 120, the primary structure members 120 can appear compact and aesthetically pleasant. Tampering of the conduit 172 can be avoided, maintenance can be simple and safety can be ensured.

Figure 25:
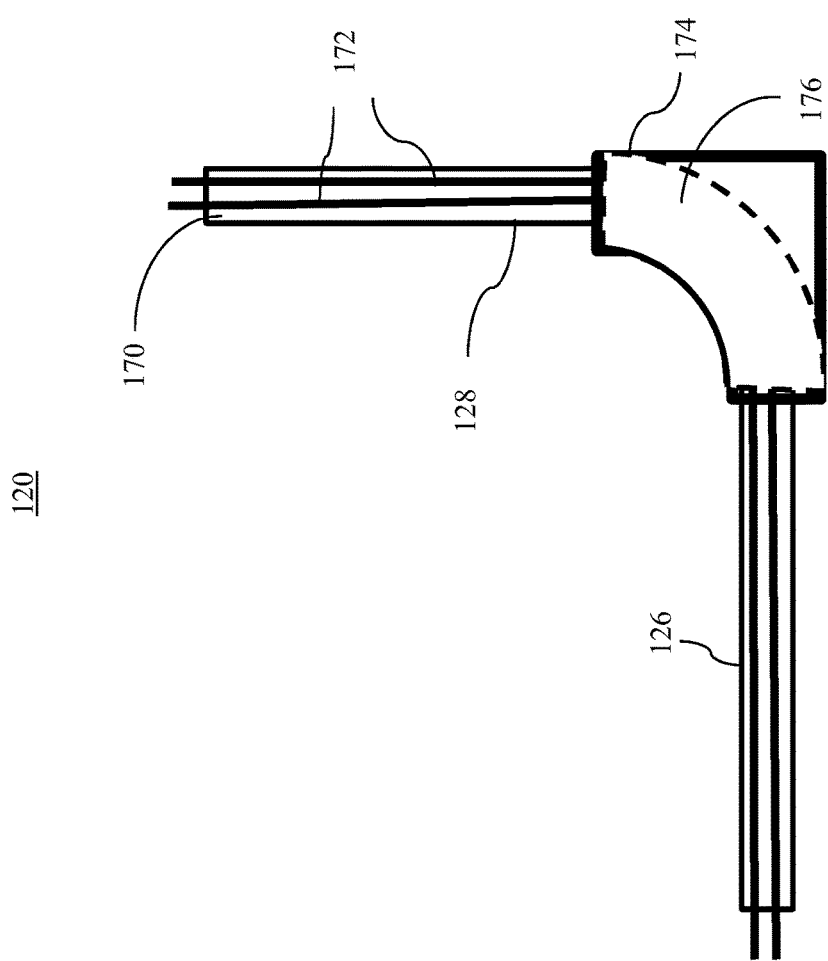
FIG. 25 is an exemplary diagram illustrating an alternative embodiment of the primary structure member of FIG. 24, wherein the primary structure member includes a corner member.

Turning to FIG. 25, an exemplary primary structure members 120 is shown. The second wall portion 128 and the second floor portion 126 are shown as being joined by a corner member 174. The corner member 174 is shown as defining a corner cavity 176 (indicated by dashed line) having a curved shape. The corner cavity 176 can communicate with the cavities 170 of the second wall portion 128 and the second floor portion 126. The corner cavity 176 can provide a curved pathway for the conduit 172. Advantageously, kinks in the conduit 172 can be prevented and the conduit 172 can function optimally.

The corner member 174 and the primary structure members 120 can be made of uniform and/or different materials. For example, the primary structure members 120 can be made of metal via casting and the corner member 174 can be made of a polymer via 3D printing.

Although FIG. 25 shows the second wall portion 128 and the second floor portion 126 as being joined by the corner member 174 for illustrative purposes only, the corner member 174 connected any two adjacent portions of the primary structure members 120, without limitation.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A construction assembly, comprising:
 a plurality of primary structure members radially distributed about a center region, each having an S shape defining first and second level recesses, each primary structure member being in a standing position with the first and second level recesses being respectively proximal to and distal from ground, each primary structure member including:
  a first floor portion parallel to the ground;
  a first wall portion connected with and vertical to the first floor portion;
  a second floor portion connected to the first wall portion and parallel to the first floor portion, the first floor portion, the first wall portion and the second floor portion collectively defining the first level recess;
  a second wall portion connected to the second floor portion and parallel to the first wall portion; and
  a ceiling portion connected to the second wall portion and parallel to the first floor portion, the second floor portion, the second wall portion and the ceiling portion collectively defining the second level recess;
 a second level ring joining the second floor portion of each of the primary structure members;
 a ceiling ring joining the ceiling portion of each of the primary structure members; and
 a foundation located between the first floor portion and the ground, said foundation including:
  a plurality of channel members each receiving the first floor portion of one of the primary structure members; and
  a foundation panel located between every two adjacent channel members,
 the first wall portions collectively surrounding and defining a first level space and the second wall portions collectively surrounding and defining a second level space greater than the first level space,
 wherein the first floor portion terminates at a base terminal region that is rotatably coupled with the channel member at a pivot point, the primary structure member being configured to convert from the standing position to a laying position by pivoting as a whole about the pivot point such that the first floor portion pivots from the ground to a non-parallel position relative to the ground.

2. A construction assembly, comprising:

a plurality of primary structure members each having an S shape defining first and second level recesses, the primary structure members being in a standing position with the first and second level recesses being respectively proximal to and distal from ground, the first level recesses collectively defining a first level space and the second level recesses collectively defining a second level space greater than the first level space; and a foundation on the ground and configured to support the primary structure members in the standing position, wherein each primary structure member includes a plurality of portions including:

a first floor portion parallel to the ground in the standing position;

a first wall portion connected to and vertical to the first floor portion;

a second floor portion connected to the first wall portion and parallel to the first floor portion;

a second wall portion connected to the second floor portion and parallel to the first wall portion; and a ceiling portion connected to the second wall portion and parallel to the first floor portion, the foundation receiving the first floor portion, wherein the first floor portion terminates at a base terminal region that is rotatably coupled with the foundation at a pivot point, wherein the primary structure member is configured to convert from the standing position to a laying position by pivoting as a whole about the pivot point such that the first floor portion pivots from the ground to a non-parallel position relative to the ground.

3. The construction assembly of claim 2, wherein said plurality of primary structure members extend radially from about a center region.

4. The construction assembly of claim 2, wherein said foundation includes a foundation base centered at a center region.

5. The construction assembly of claim 4, wherein said foundation includes a plurality of channel members each connected to the foundation base and receiving the first floor portion of one of the primary structure members.

6. The construction assembly of claim 5, wherein said foundation further includes one or more foundation adjustment members between at least one of the channel members and the ground, the foundation adjustment members configured to adjust position of the channel member relative to the ground.

7. The construction assembly of claim 5, wherein the first floor portion terminates at a base terminal region that is rotatably coupled with the channel member at the pivot point.

8. The construction assembly of claim 2, wherein each of the primary structure members includes a hollow structure defining a cavity therein.

9. The construction assembly of claim 8, further comprising one or more conduits received in the cavity.

10. The construction assembly of claim 8, wherein at least two of the adjacent portions of each of the primary structure members are connected via a corner member defining a corner cavity therein, the corner cavity being curved and in communication with the cavity of the adjacent portions.

11. The construction assembly of claim 2, wherein the second floor portion is connected to the first wall portion at a second floor terminal region, and wherein the construction assembly further comprises a second level ring joining the second floor terminal region of each of the primary structure members.

12. The construction assembly of claim 2, wherein the ceiling portion is terminated at a ceiling terminal region, and wherein the construction assembly further comprises a ceiling ring joining the ceiling terminal region of each of the primary structure members.

13. The construction assembly of claim 2, wherein one or more of the plurality of portions has an adjustable length.

14. The construction assembly of claim 2, further comprising a second floor panel located between two adjacent second floor portions.

15. The construction assembly of claim 2, further comprising a ceiling panel located between two adjacent ceiling portions.

16. The construction assembly of claim 2, further comprising a travel mechanism in the first level space configured to provide access from the first level space to the second level space.

17. A method for building a construction assembly, comprising:

laying out a foundation on ground;

positioning a plurality of primary structure members each in a laying position and connected to the foundation at a pivot point, each primary structure member having an S shape including a plurality of portions including:

a first floor portion perpendicular to the ground in the laying position and terminating at a base terminal region that is rotatably coupled with the foundation at the pivot point;

a first wall portion connected to and vertical to the first floor portion;

a second floor portion connected to the first wall portion and parallel to the first floor portion;

a second wall portion connected to the second floor portion and parallel to the first wall portion; and a ceiling portion connected to the second wall portion and parallel to the first floor portion; and raising the plurality of primary structure members from the laying position to a standing position by pivoting each of the plurality of primary structure members as a whole about the pivot point such that the first floor portion pivots to be parallel with the ground.

18. The method of claim 17, wherein the plurality of primary structure members each has the S shape including first and second portions respectively defining first and second level recesses, and wherein said positioning includes distributing the primary structure members radially about a center region with the first and second level recesses being respectively proximal to and distal from the foundation.

* * * * *